United States Patent [19]

Vetjens

[11] Patent Number: 4,477,836
[45] Date of Patent: Oct. 16, 1984

[54] SYSTEM FOR CONVERTING IMAGE INFORMATION INTO ELECTRICAL SIGNALS

[75] Inventor: Marinus J. P. Vetjens, Helmond, Netherlands

[73] Assignee: Océ-Nederland B.V., Venlo, Netherlands

[21] Appl. No.: 409,318

[22] Filed: Aug. 18, 1982

[30] Foreign Application Priority Data

Aug. 24, 1981 [NL] Netherlands ............. 8103918

[51] Int. Cl.³ .............................. H04N 1/12
[52] U.S. Cl. ............................ 358/293; 358/294
[58] Field of Search .............. 358/293, 294, 285; 250/225, 227

[56] References Cited

U.S. PATENT DOCUMENTS

| | | | |
|---|---|---|---|
| 3,264,407 | 8/1966 | Headd et al. | 358/293 |
| 3,566,119 | 2/1971 | Lewis | 250/566 |
| 4,199,789 | 4/1980 | Yuard | 358/294 |
| 4,220,978 | 9/1980 | Rhyins | 358/293 |

FOREIGN PATENT DOCUMENTS

| | | |
|---|---|---|
| 1102207 | 2/1956 | Fed. Rep. of Germany . |
| 2151529 | 4/1973 | Fed. Rep. of Germany . |
| 7015903 | 5/1971 | Netherlands . |

OTHER PUBLICATIONS

RCA Review, A Technical Journal, published quarterly by RCA Laboratories, vol. XV, by Warren H. Bliss and Charles J. Young, (Sep. 1974), pp. 275–290.
An Improved Optical Scanning Head for Facsimile Transmitters by M. S. Pembroke, Muirhead Technique, vol. 11, No. 3, (Jul. 1957), pp. 23, 24.
Patents Abstracts of Japan, vol. 2, No. 19, (Feb. 8, 1978), No. 5218183.

Primary Examiner—Howard W. Britton
Attorney, Agent, or Firm—Albert C. Johnston

[57] ABSTRACT

In a system for converting visible information into electrical signals, in which a light beam such as a laser beam scans an original linewise and resulting reflections from the original are collected and directed to signal generating detector means, such as a photoelectric detector, by a light-transmitting body bounded by an entry surface and by two broad specular surfaces parallel to the line to be scanned, the light-transmitting body is provided with two lateral side surfaces which at least near the entry surface are perpendicular to the line connecting the ends of the line to be scanned and are made specular, as by being polished, so that the intensity level sensed at the detector is increased by internal reflections of the side surfaces. A concave configuration of the entry surface enhances the collection of diffuse reflections. The light of specular reflections can be prevented from saturating the detector by employing a suitably polarized light beam for the scanning or by providing a polarization filter in the path of reflected light between the original and the light-transmitting body.

15 Claims, 7 Drawing Figures

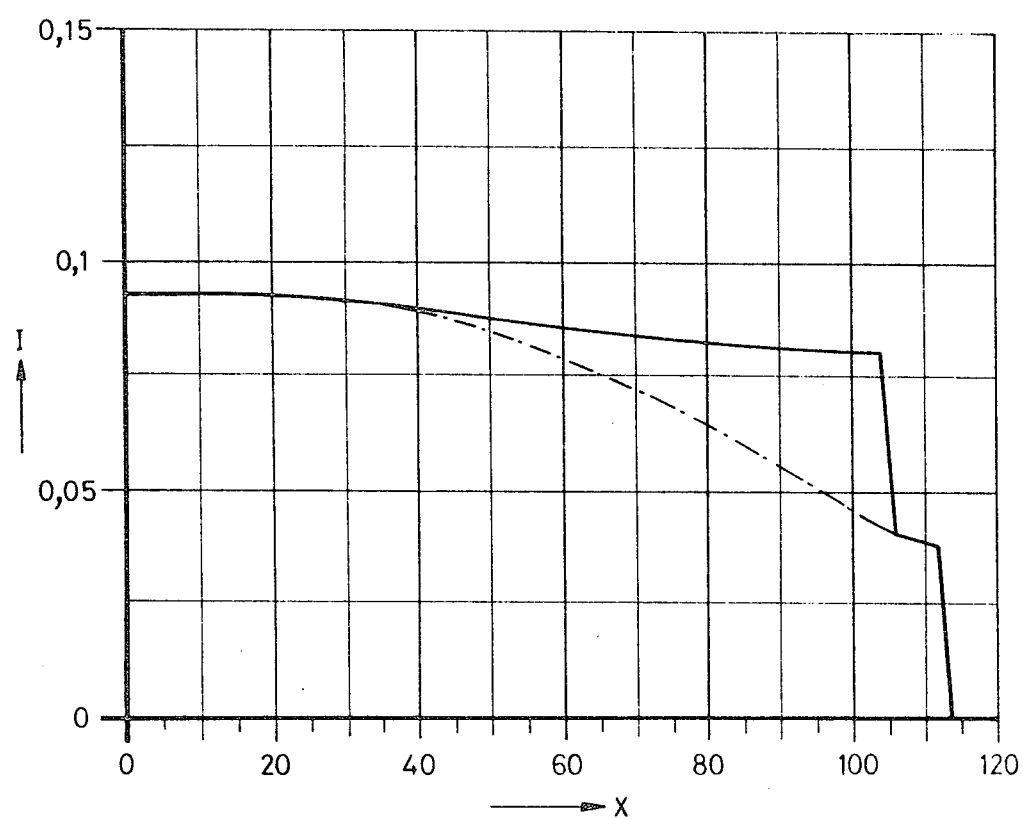

SYSTEM FOR CONVERTING IMAGE INFORMATION INTO ELECTRICAL SIGNALS

This invention relates to a system for converting image information, such as the information written or imprinted on an original document, into electrical signals.

A system for this purpose is known in which the original is scanned linewise by means of a light beam and the light reflected by the original is passed through a light transmission means to a detector which detects variations of the light that it receives and correspondingly delivers electrical signals. The light transmission means comprises a light-pervious body having an entry surface extending lengthwise of a line to be scanned by the light beam, two parallel specular surfaces extending from the entry surface to the detector, which surfaces face one another and are substantially parallel to the line to be scanned by the light beam, and two side surfaces which border laterally the space between the entry surface, the parallel specular surfaces and the detector.

In the use of such a system, a light beam delivered from a light source, such as a laser, is fed to the original to be scanned via one or more lenses, one or more mirrors and a scanner such as a galvanoscanner. The light beam is focussed to the required spot size by one of the lenses and then is directed to and along a line of information on the original. The light of the beam is reflected to a greater or lesser extent in the scanning area of the surface of the original, depending upon the information present there, and then is fed to the detector via the light transmission means, or so-called collector. The collector has broad parallel surfaces which usually are polished in order to reflect internally the light that meets them at an angle greater than the critical angle.

In practice it has been found that the configuration and finish of the light-pervious body, or plate, forming the light transmission means are very important to the obtention of an optimum detection signal at the light detector.

The magnitude of the signal obtained at the detector depends both upon the distance between the original and the detector and upon the angle between the main viewing line of the detector and the line from the detector to the light spot on the original; the signal magnitude is inversely proportional to each of these factors. Thus, in order to obtain an optimum detector signal, it would be necessary: (1) to have the detector signal at the maximum practicable magnitude, i.e. issued at a high "signal-to-noise ratio", and (2) to have the signal magnitude independent of the said angle.

The first of these requirements is favored if the distance between the original and the detector is as small as practicable, while the second of them is favored if that distance is as large as practicable. It is therefore not possible to satisfy both requirements simultaneously; either the distance is relatively large in order to satisfy the second requirement, in which case the signal is weaker, or else the distance is relatively small to satisfy the first requirement, in which case the maximum angle is so large that there is a considerable difference in signal magnitude between the middle and the ends of the scan line.

The principal object of the present invention is to provide an improved system by which the problems noted above can be obviated and, more particularly, to provide in a system of the kind described a light transmission means, or collector, having a configuration and finish such that, with either a relatively small or relatively large distance provided between the original and the detector, a signal can be obtained which is substantially independent of the angle between the main viewing line of the detector and the line from the detector to the light spot on the original.

To this end, according to the invention, a system of the kind hereinabove mentioned is provided, including means for scanning an original linewise by a light beam, detector means for issuing signals in response to light reflections from the original and light transmission means comprising a light-pervious collector for passing light reflected by the original to the detector means, in which system the light transmission means, or collector, is made with lateral side surfaces which in the vicinity of the entry surface are substantially perpendicular to the line connecting the ends of the line to be scanned and are specular at least near the entry surface where they face each other. This construction of the collector gives a very good light transmission with an optimum light intensity profile at the detector means of the system. By the term "optimum" is meant an intensity profile, relative to the length of the scan line, which is as high and rectilinear as practicable.

Generally, the height of the light intensity profile at the detector is also determined by the number of light beam reflections occurring at the broad main surfaces of the collector. The greater the number of mirror images detectable by the detector, the higher is the intensity profile obtained. Such internal reflections make a greater contribution to the intensity profile than would the amount of extra light collected if the collector plate were made thicker.

In one advantageous embodiment according to the invention, in which the main surfaces of the collector plate are polished, the plate is made relatively long, e.g. with dimensions of 210 mm×300 mm×6 mm, and the narrow side surfaces are polished over a small distance from the entry surface. Such a plate gives a substantially straight intensity profile without fluctuations.

In another advantageous embodiment of the invention, in which the main surfaces again are polished, the plate is made relatively short, e.g. with dimensions of 210 mm×200 mm×6 mm, and the narrow side surfaces are polished over their full length. Such a plate gives a higher but not completely straight intensity profile with some fluctuations.

According to another advantageous feature of the invention, the entry surface of the collector plate is hollowed out to a concave configuration such that the light beams reflected to the collector meet the entry surface perpendicularly, with minimum loss of intensity due to reflections at the entry surface. It is also advantageous to make the exit surface of the collector so that it gives a white diffuse reflection up to the vicinity of the detector, as in this way a uniform increase in the light intensity profile can be obtained.

The above mentioned and other objects, features and advantages of the invention will be further evident from the following description and the accompanying drawings. In the drawings.

Figure 1:
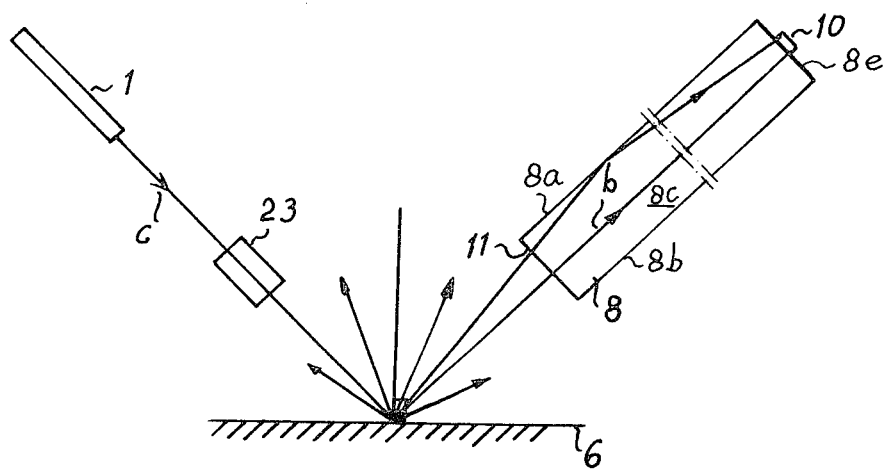
FIG. 1 is a schematic view of an arrangement of elements of a system according to the invention.
Figure 5:
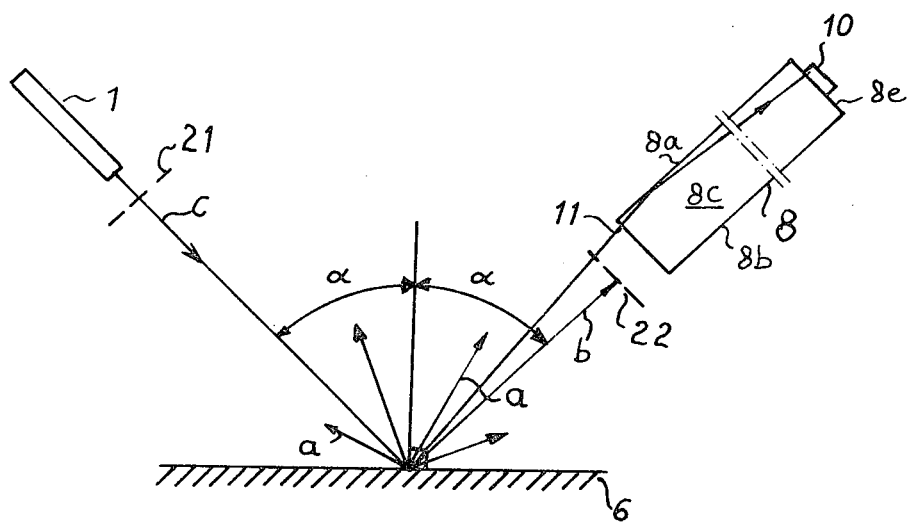
FIG. 5 is a schematic view of systems according to the invention making use of a polarization filter in the path of the light beam to eliminate specular reflections.

The system arrangement as illustrated schematically in FIGS. 1 and 5 can be such that a light beam is delivered from a light at source 1, such as a laser, via a lens system, a mirror and a galvanoscanner to an original 6 to be reproduced, which is wound on and movable about the axis of a drum or roller. Light reflected by the original is collected by a light transmission means or collector 8 and fed onto a detector 10. The collector 8 may be suspended in a carriage adapted to traverse an angle about the axis of the drum so that the distance between the collector and the drum does not change. The function of the lens system is to focus the laser beam to a minute spot of light scanning linewise the surface of an original on the drum. The detector may be, for example, a UDT600, the signal of which is amplified by a linear amplifier, e.g. of type 46J. The bandwidth of such a detector-amplifier system is ±750 kHz with an amplification factor of ±10 000. If desired a stepping motor can be used to rotate the drum. The speed of drum movement and also the resolving power of the detector means are of relatively little significance in the context of the present invention.

FIG. 1 shows schematically a light beam c from the light source 1 being directed toward the original 6 at an angle relative to the normal. The scanning of a line to be scanned on the original is effected via a polygonal mirror 23, which may be a rotating octagonal mirror. The light beam b obtained after diffuse reflection from the original is collected by the collector 8 via its entry surface 11 and fed to the detector 10. The collector body advantageously is made of transparent material.

As stated before, the level of the intensity profile of the light received at the detector is greatly dependent on the number of reflections of light occurring at the broad main surfaces 8a, 8b of the collector. The more mirror images delivered to the detector, the higher the total light intensity that can be detected. Such reflections make a greater contribution to the intensity profile than would an increased amount of light collected by making the entry surface or window 11 of the collector wider; and this applies given the same distance from the original. Accordingly, a relatively thin collector plate, e.g. a plate 6 mm thick, delivers 180% more light for signal generation than a 22 mm thick plate when the length of both plates is 297 mm. As usual, the broad main surfaces should be completely or partially polished.

To obtain an optimum intensity profile, it has been found very important to select the correct plate configuration in combination with a certain distance from the entry surface over which the narrow side surfaces of the collector are polished. A specific plate configuration according to the present invention will then be selected, dependent upon the required sensitivity of detection of the information on the original and upon the extent, if any, to which gray shades are to be detected. With a maximum light intensity on the detector, the amplification of the electronic signalling system can be kept low, and this gives a high bandwidth of information detection.

Figure 2:
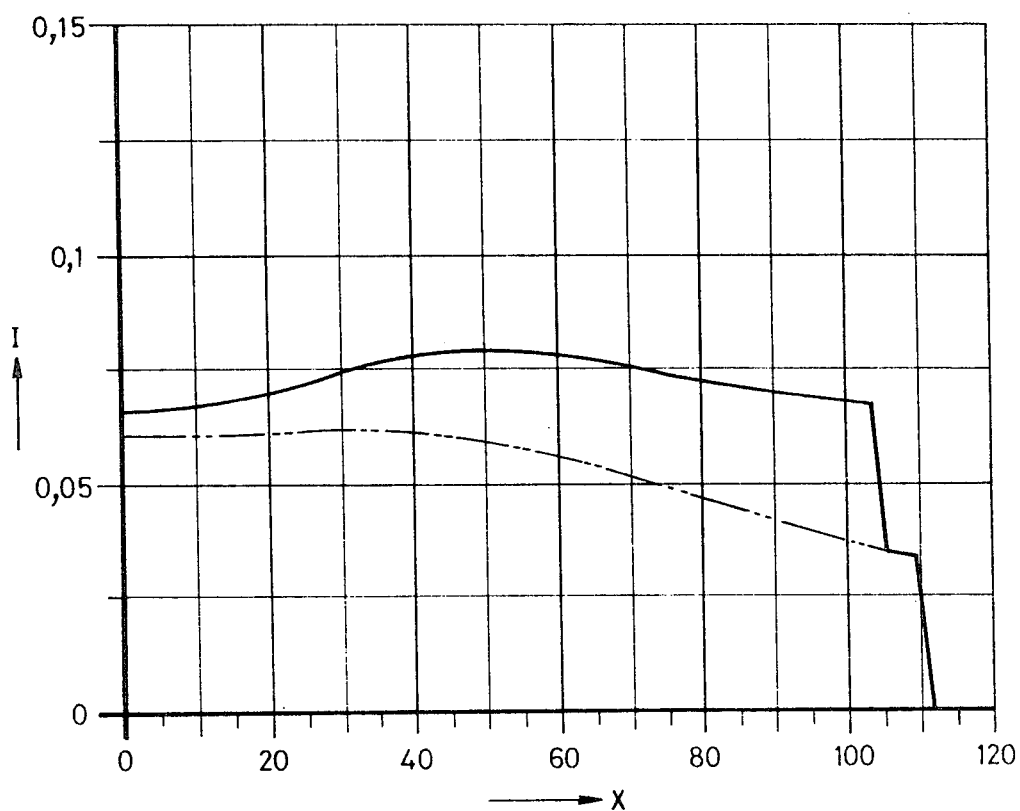
FIGS. 2a, 2b and 2c are diagrams of light intensity profiles of three differently dimensioned collectors according to the invention.
Figure 2C:
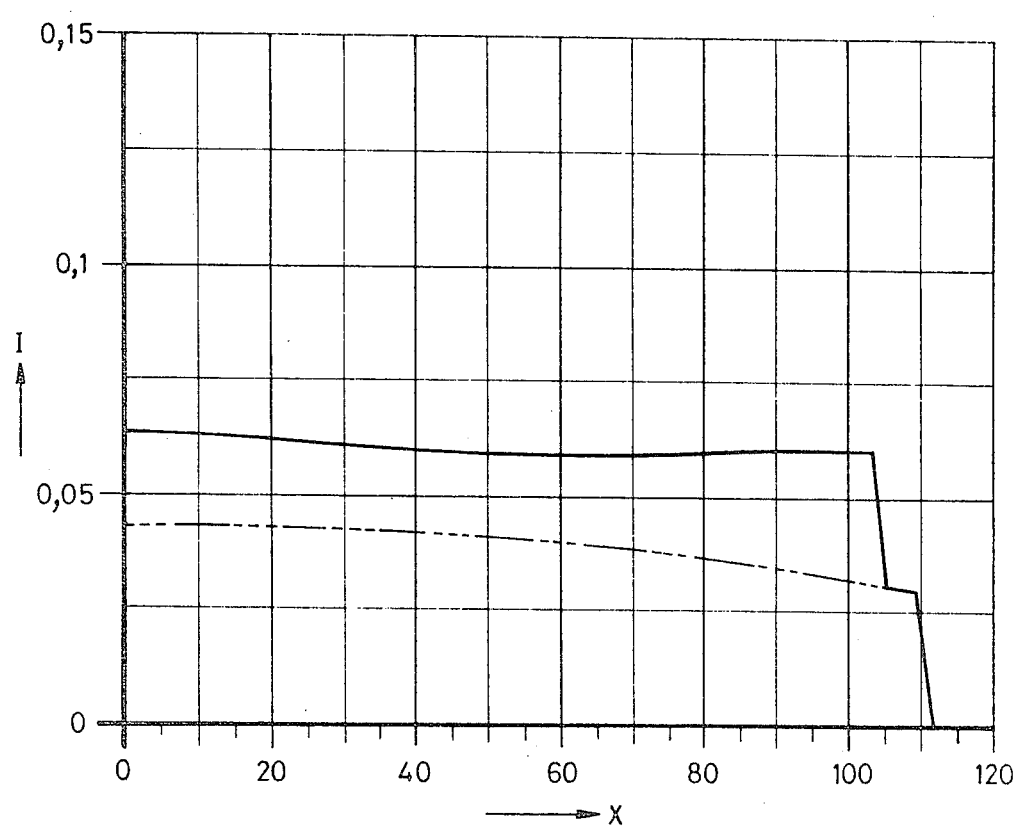

FIGS. 2a, 2b and 2c of the drawings illustrate comparable light intensity profiles obtained at the detector 10 with the use of collector plates 8 having different configurations. The intensity I has been plotted to the distance X (in mm) from the middle to the end of the scanned line. The solid plot lines represent the case in which the narrow side surfaces 8c, 8d of the plates are polished, and the broken plot lines represent the case in which those surfaces are not polished. FIG. 2a indicates the profile values of a collector plate having a length of 200 mm; FIG. 2b indicates the profile values of a collector plate having a length of 250 mm; and FIG. 2c indicates the profile values of a collector plate having a length of 300 mm. In all these collectors the side surfaces near the entry surface are substantially perpendicular to the line connecting the ends of the line to be scanned. The difference in the intensity profile between the collector having fully polished narrow side surfaces and the collector without polished narrow side surfaces will be clearly evident.

To obtain maximum light intensity at the detector, a relatively short collector will be selected, for instance a transparent plate having dimensions of 210 mm×200 mm×6 mm, the narrow side surfaces of which are fully polished (and of course the broad main surfaces as well). The reflecting side surfaces raise the light intensity profile obtained at the ends of the scanned line so that it is substantially straight, though possibly with some fluctuations, as indicated in FIG. 2a. A longer collector, e.g. one of 210 mm33 300 mmb ×6 mm in dimensions, will be selected for maximum detection of gray gradations in the image information on an original, in which case the narrow side surfaces need to be polished over only a few mm from the entry surface. As indicated in FIG. 2c, this gives a somewhat lower but still desirable intensity profile without substantial fluctuations, with need for the signal processing to satisfy somewhat higher requirements in view of the somewhat lower intensity level.

In each of the above cases relating to the scanning of an original, the length of the entry surface of the collector (or width of the collector along its end facing the scanning line) is advantageously made equal to the length of the scanning line. The exit surface 8e at the other end of the collector advantageously can be made to give a white diffuse reflection up to a location in the vicinity of the detector. In this way, beams which otherwise would leave the collector plate are reflected randomly within the plate by the diffuse reflection surfaces, so that a rise in the intensity profile amounting usually to about 10% is obtained.

Figure 3:
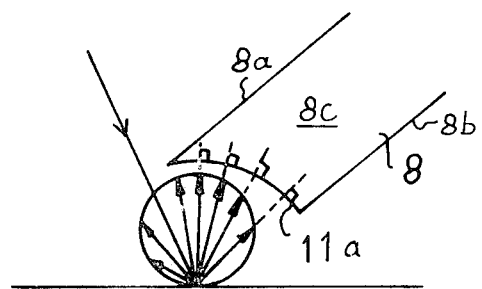
FIG. 3 is a schematic view of a collector having its entry surface hollowed for optimum entry of the reflected beams.

FIG. 3 shows schematically an embodiment of the invention in which the entry surface or window 11a of the collector 8 is hollowed out to present a concave configuration extending lengthwise of the scanning line. The curvature of the entry surface is such that the reflected beams resulting from impingement of the incident light beam on the original can enter the surface 11a perpendicularly, thus minimizing reflections at the entry surface.

It is also important to mount the collector so that its mounting does not affect the light transmission, as certain conditions, such for example as contact with the collector near the entry surface, have distinct consequences on the intensity profile obtained. The profile can also be adversely affected by contamination of the collector.

Figure 4:
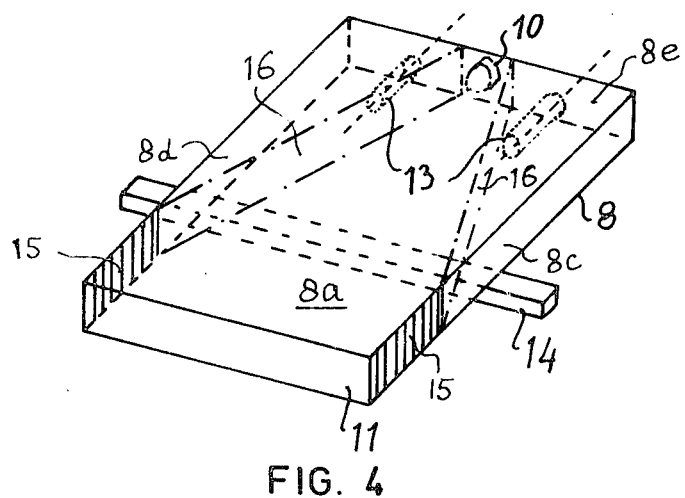
FIG. 4 is a schematic view of a construction and mounting means of a collector embodying the invention.

FIG. 4 shows schematically an arrangement suitable for mounting the collector. In this example, the collector 8 is formed with two mortices 13 in its exit end, which can receive mounting pins and are located near the detector 10 but outside its viewing angle; and a middle portion of the collector body is supported by a bar 14. The collector is supported evenly over its entire width by the bar 14, thus ensuring that any effect on the intensity profile is made uniform.

As further illustrated in FIG. 4, in the case of a collector 8 having its narrow side surface polished over only a small distance from the entry surface 11, for instance as indicated at 15, the remainder of the collector plate can, if desired, be bevelled toward the detector 10 as indicated by the broken lines at 16.

FIG. 5 shows schematically a system according to the invention by which an adverse effect of specular reflections that occur in the scanning of originals can be eliminated. The light reflected by the original generally is of two kinds, i.e. the specular component b and various diffuse components a. The specular component may cause problems if it is directly incident to the entry surface 11 of the collector, as light of relatively high intensity is then incident to the detector 10 at the other end of the collector. This can cause the detector to become saturated, with consequent loss of information. This adverse effect of the specular component can be eliminated in either of two ways.

In a first way of eliminating that effect, the light beam c from the light source 1 is passed through a polarization filter 21, by which the beam is linearly polarized in a plane perpendicular to the scanning line, and is directed onto the original 6 at the Brewster angle α relative to a plane normal to the original. During the reflection process the diffusely reflected light will be randomly polarized, but in the direction of polarization parallel to the scanning line beams of the diffuse component a will remain unaffected and will reach the detector. The specular component b, on the other hand, will be completely or substantially completely attenuated, depending upon surface qualities of the original. The result is attributable to the essential difference between diffuse reflection and specular reflection and to the regularity of the Brewster angle.

In a second way of avoiding the adverse effect of specular reflection, the laser light beam c, without being polarized, is directed onto the original 6 at the Brewster angle α relative to a plane normal to the original, and the reflected light is collected at the entry surface 11 via a polarizing filter 22. In this way only components of the diffuse reflections from the original can reach the detector.

The first way gives a greater quantity of detected light at the detector 10. In the use of either way, care must be taken to ensure that during detection there is no reflected light component present which is polarized parallel to the scanning line.

I claim:

1. In a system for converting information on an original into electrical signals, comprising means for scanning the original linewise by a light beam focussed to a spot directed onto and moved along a line on the original, detector means for detecting and for issuing electrical signals in response to light of said beam reflected by the original and means for transmitting such reflected light to said detector means, said light transmitting means including a transparent entry surface extending longitudinally of a said line to be scanned by said beam, two confronting, parallel specular surfaces which extend from the entry surface to the detector means and are substantially parallel to said line, and two side surfaces which border laterally the region bounded by the entry surface, said parallel specular surfaces and the detector means, the improvement which comprises that said side surfaces in the vicinity of said entry surface are substantially perpendicular to a line connecting the ends of said line to be scanned and are made specular at least near said entry surface.

2. A system according to claim 1, said light-transmitting means being a body of transparent material formed with and bounded by said entry surface, said confronting parallel specular surfaces and said side surfaces.

3. A system according to claim 1, the length of said entry surface being substantially equal to the length of the line to be scanned.

4. A system according to claim 1, 2 or 3, said side surfaces being polished over substantially their entire length.

5. A system according to claim 1, 2 or 3, said entry surface being hollowed out to a concave configuratation extending lengthwise thereof so that reflected light beams will enter the entry surface substantially perpendicularly with minimum loss of intensity by reflections at the entry surface.

6. A system according to claim 4, said entry surface being hollowed out to a concave configuration extending lengthwise thereof so that reflected light beams will enter the entry surface substantially perpendicularly with minimum loss of intensity by reflections at the entry surface.

7. A system according to claim 1, 2 or 3, said scanning means comprising means for polarizing the light of said beam linearly in a plane perpendicular to the line to be scanned.

8. A system according to claim 7, said scanning means comprising a light source and a light polarization filter in the path of the light between said light source and the original.

9. A system according to claim 4, said scanning means comprising means for polarizing the light of said beam linearly in a plane perpendicular to the line to be scanned.

10. A system according to claim 5, said scanning means comprising means for polarizing the light of said beam linearly in a plane perpendicular to the line to be scanned.

11. A system according to claim 6, said scanning means comprising means for polarizing the light of said beam linearly in a plane perpendicular to the line to be scanned.

12. A system according to claim 1, 2 or 3, and further comprising in the path of reflected light between the original and said entry surface light polarization means whereby only light components of diffuse reflections from the original reach said detector means.

13. A system according to claim 4, and further comprising in the path of reflected light between the original and said entry surface light polarization means whereby only light components of diffuse reflections from the original reach said detector means.

14. A system according to claim 5, and further comprising in the path of reflected light between the original and said entry surface light polarization means whereby only light components of diffuse reflections from the original reach said detector means.

15. A system according to claim 6, and further comprising in the path of reflected light between the original and said entry surface light polarization means whereby only light components of diffuse reflections from the original reach said detector means.

* * * * *